(12) United States Patent
Mohanty et al.

(10) Patent No.: US 7,776,997 B2
(45) Date of Patent: Aug. 17, 2010

(54) SOLVENT RESISTANT POLYMERS

(75) Inventors: Dillip K. Mohanty, Mt. Pleasant, MI (US); Ajit Sharma, Mt. Pleasant, MI (US)

(73) Assignee: Central Michigan University Board of Trustees, Mt. Pleasant, MI (US)

( * ) Notice: Subject to any disclaimer, the term of this patent is extended or adjusted under 35 U.S.C. 154(b) by 261 days.

(21) Appl. No.: 11/346,952

(22) Filed: Feb. 3, 2006

(65) Prior Publication Data

US 2006/0155103 A1    Jul. 13, 2006

(51) Int. Cl.
*C08G 63/44* (2006.01)

(52) U.S. Cl. .................. 528/363; 528/409; 528/310; 428/457

(58) Field of Classification Search ............... 424/78; 149/19; 428/457; 528/363, 409
See application file for complete search history.

(56) References Cited

OTHER PUBLICATIONS

Kim et al Synthesis and degradation of aromatic polyamides containing nitro groups, Macromol. Chem., Suppl, 187-218 (1989).*
Stevens, Polymer Chemistry, An Introduction. 1990.*

* cited by examiner

*Primary Examiner*—James Seidleck
*Assistant Examiner*—Gregory Listvoyb
(74) *Attorney, Agent, or Firm*—Robert L. McKellar; McKellar IP Law, PLLC

(57) ABSTRACT

What is disclosed relates to polymers that resist dissolution in organic solvents, are vasodilators, and are tunable explosives. These polymers also form solvent resistant coatings and solvent resistant fibers as well as bonding materials.

1 Claim, No Drawings

SOLVENT RESISTANT POLYMERS

This application claims priority from U.S. patent application Ser. No. 11/035,319 filed Jan. 13, 2005 and U.S. Provisional Patent Application 60/536,452 filed on Jan. 14, 2004.

BACKGROUND

The instant invention relates to polymers that resist dissolution in organic solvents, are vasodilators, and are tunable explosives. These polymers also form solvent resistant coatings and solvent resistant fibers as well as bonding materials.

Polymers that resist dissolution in organic solvents have important applications such as solvent resistant coatings for objects. Fluorinated polymers (such as TEFLON® and KYNAR® brand polymers) are resistant to organic solvents but tend to have a number of undesirable properties such as relatively poor adhesion to surfaces such as glass surfaces.

SUMMARY OF THE INVENTION

In one embodiment, the instant invention is a polymer corresponding to the formula:

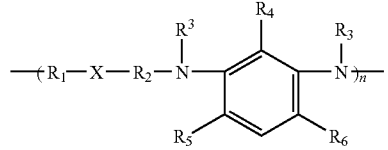

wherein $R_1$ and $R_2$ are aromatic organic groups and X is selected from the group consisting of $SO_2$, CO, N=N, O, and $CR_7R_8$, wherein $R_7$ is selected from the group consisting of H and an organic group and wherein $R_8$ is independently selected from the group consisting of H and an organic group and wherein $R_3$ is selected from the group consisting of $NO_2$, $N_2O_2$, O and H, wherein $R_4$ is selected from the group consisting of a sulfonate group, H, $NO_2$ and $NH_2$, wherein $R_5$ is selected from the group consisting of $NO_2$ and $NH_2$, wherein $R_6$ is selected from the group consisting of $NO_2$ and $NH_2$ and wherein n is greater than about twenty. These materials are useful, for example, in forming solvent resistant coatings and solvent resistant fibers as well as for bonding materials.

In another embodiment, the instant invention is a polymer corresponding to the formula:

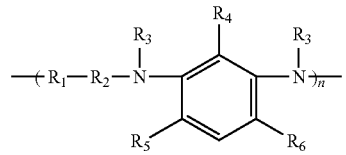

wherein $R_1$ is selected from the group consisting of cyclic and acyclic organic groups, wherein $R_2$ is independently a cyclic or acyclic organic group, wherein $R_3$ is selected from the group consisting of $NO_2$, $N_2O_2^-$, OH and H, wherein $R_4$ is selected from the group consisting of an alkyl group, a sulfonate group, H, $NO_2$ and $NH_2$, wherein $R_5$ is selected from the group consisting of $NO_2$ and $NH_2$, wherein $R_6$ is $NO_2$ or $NH_2$ and where n is greater than about twenty.

These materials are useful, for example, in forming solvent resistant coatings and solvent resistant fibers as well as for bonding materials.

In yet another embodiment, the instant invention is a polymer corresponding to the formula:

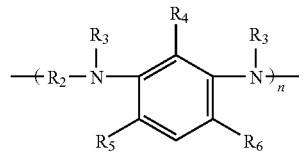

wherein $R_2$ is independently selected from the group consisting of cyclic and acyclic organic groups, wherein $R_3$ is selected from the group consisting of $NO_2$, $N_2O_2^-$, OH and H, wherein $R_4$ is selected from the group consisting of an alkyl group, a sulfonate group, H, $NO_2$ and $NH_2$, wherein $R_5$ is selected from the group consisting of $NO_2$ and $NH_2$, wherein $R_6$ is selected from the group consisting of $NO_2$ and $NH_2$ and wherein n is greater than about twenty.

A specific example of a polymer of the instant invention is a polymer corresponding to the formula:

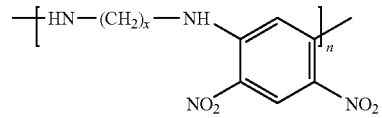

wherein x is in the range of from 2 to 12 and wherein n is greater than about twenty.

Another specific example of a polymer of the instant invention is a polymer corresponding to the formula:

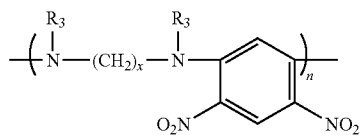

wherein $R_3$ is $N_2O_2^- M^+$ and x is in the range of from 2 to 12 and wherein n is greater than about twenty. These materials also have vasodilatation effects and can be used as vasodilatators. It is believed that the polymers slowly release NO to give the desired effect. Certain of these polymers are explosives given the requisite amount of shock. For example, polymers such as those having five nitro groups, three on the ring and two on the nitrogen atoms. The explosives materials are "tunable" in the sense that polymers having longer aliphatic alkyl chains are less dangerous while those have shorter aliphatic alkyl chains, for example, two methylene units, are more potent.

DETAILED DESCRIPTION OF THE INVENTION

In one embodiment, the instant invention is a polymer corresponding to the formula:

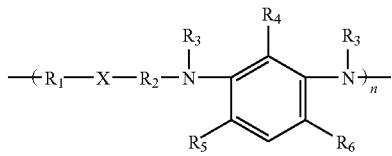

wherein $R_1$ and $R_2$ are aromatic organic groups and X is selected from the group consisting of $SO_2$, CO, N=N, O, and $CR_7R_8$, wherein $R_7$ is selected from the group consisting of H and an organic group and wherein $R_8$ is independently selected from the group consisting of H and an organic group, wherein $R_3$ is selected from the group consisting of $NO_2$, $N_2O_2^-$, OH and H, wherein $R_4$ is selected from the group consisting of a sulfonate group, H, $NO_2$ and $NH_2$, wherein $R_5$ is selected from the group consisting of $NO_2$ and $NH_2$, wherein $R_6$ is selected from the group consisting of $NO_2$ and $NH_2$ and wherein n is greater than about twenty. These materials are also useful, for example, in forming solvent resistant coatings and solvent resistant fibers as well as for bonding materials.

In another embodiment, the instant invention is a polymer corresponding to the formula:

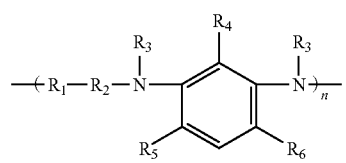

wherein $R_1$ is a selected from the group consisting of cyclic and acyclic organic group, where $R_2$ is independently a cyclic or acyclic organic groups, wherein $R_3$ is selected from the group consisting of $NO_2$, $N_2O_2^-$, OH and H, wherein $R_4$ is selected from the group consisting of a sulfonate group, H, $NO_2$ and $NH_2$, wherein $R_5$ is selected from the group consisting of $NO_2$ and $NH_2$, wherein $R_6$ is selected from the group consisting of $NO_2$ and $NH_2$ and wherein n is greater than about twenty.

In yet another embodiment, the instant invention is a polymer corresponding to the formula:

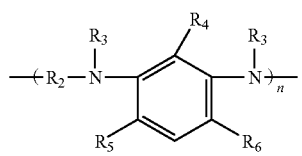

wherein $R_2$ is independently selected from cyclic and acyclic organic groups, wherein $R_3$ is selected from the group consisting of $NO_2$, $N_2O_2^-$, OH and H, wherein $R_4$ is selected from the group consisting of a sulfonate group, H, $NO_2$ and $NH_2$, wherein $R_5$ is selected from the group consisting of $NO_2$ and $NH_2$, wherein $R_6$ is selected from the group consisting of $NO_2$ and $NH_2$ and wherein n is greater than about twenty.

A specific example of a polymer of the instant invention is a polymer corresponding to the formula:

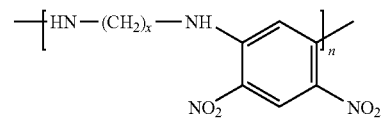

wherein x is in the range of from 2 to 12 and wherein n is greater than about twenty. This embodiment of the instant invention can be made by the following synthesis scheme.

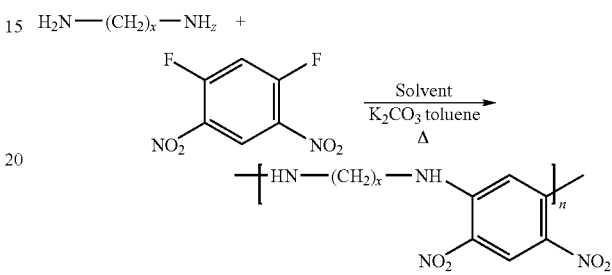

Preferably, the maximum temperature of the synthesis reaction is from about one hundred degrees Celsius to two hundred and fifty degrees Celsius with a time at such maximum temperature of from fifteen to thirty minutes. A gradual linear temperature rise to such maximum temperature from room temperature is preferably employed over a period of time of from two and one half to four hours.

This invention also deals with polymeric amines corresponding to the general formula:

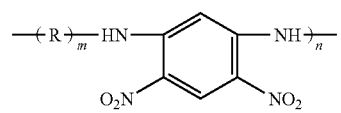

wherein R is selected from a group consisting of (i) a methylene group wherein m has a value ranging from 2 to 20, (ii) a cyclic group, (iii) a polycyclic group, and (iv) a branched aliphatic group, and n has a value of greater than twenty.

Still further, this invention deals with per-nitrated polymeric amines having the general formula:

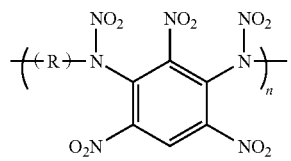

wherein R is selected from a group consisting of (i) a methylene group wherein m has a value ranging from 2 to 20, (ii) a cyclic group, (iii) a polycyclic group, and (iv) a branched aliphatic group and n has a value greater than twenty.

This invention also deals with nitrosolated polymeric amines having the general formula:

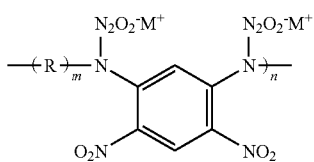

wherein R is selected from the group consisting of (i) a methylene group wherein m has a value of from 2 to 20, (ii) a cyclic group, (iii) a polycyclic group, and (iv) a branched aliphatic group, $M^+$ is selected from the group consisting of sodium and potassium and n has a value of greater than twenty.

This invention also deals with nitrated polymeric amines having the general formula:

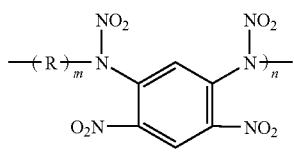

wherein R is a methylene group, m has a value of from 2 to 20 and n has a value of greater than twenty.

The following examples illustrate the preferred synthesis scheme for various values of x.

| x | Max Temp (° C.) | Solvent | % Yield |
|---|---|---|---|
| 2 | 230/190 | diphenyl sulfone/NMP | 70.0% |
| 3 | 135/190 | diphenyl sulfone/NMP | 88.6% |
| 4 | 220/190 | diphenyl sulfone/NMP | 87.2% |
| 5 | 205 | NMP | 87.4% |
| 6 | 210/200 | diphenyl sulfone/NMP | 85.6% |
| 7 | 210/200 | diphenyl sulfone/NMP | 79.9% |
| 8 | 210/200 | diphenyl sulfone/NMP | 81.5% |
| 9 | 190/200 | diphenyl sulfone/NMP | 74.5% |
| 10 | 210/200 | diphenyl sulfone/NMP | 82.1% |
| 11 | 215/200 | diphenyl sulfone/NMP | 88.8% |
| 12 | 220/200 | diphenyl sulfone/NMP | 92.5% |

The polymers made by the above synthesis scheme have the following thermal decomposition characteristics.

TABLE 4

Thermogravimetric analysis data of1 (a-k)

| 1 | Number of methylene unit per repeating unit x | Percent Residue at 850° C. | Isothermal loss# (%) |
|---|---|---|---|
| a | 2 | 22.77 | 1.62 |
| b | 3 | 29.37 | 4.44 |
| c | 4 | 29.84 | 3.53 |
| (1 | 5 | 52.25 | 9.56 |
| e | 6 | 53.17 | 9.19 |
| f | 7 | 44.65 | 9.13 |
| 8 | 8 | 40.12 | 9.40 |
| h | 9 | 36.46 | 8.92 |
| i | 10 | 32.84 | 8.74 |
| .1 | 11 | 32.10 | 8.02 |
| k | 12 | 26.86 | 7.07 |

TGA Heating rate: 10°/min.
240° C., 1 h, N2

The polymers made by the above synthesis scheme have the following melting points and intrinsic viscosity (in aqueous concentrated sulfuric acid at twenty-five degrees Celsius).

| x | $T_m$ ° C. | Viscosity [n] |
|---|---|---|
| 2 | n/a | 0.083 |
| 3 | n/a | 0.114 |
| 4 | n/a | 0.171 |
| 5 | 149.54 | 0.394 |
| 6 | 148.03 | 0.347 |
| 7 | 133.31 | 0.770 |
| 8 | 99.76; 152.22* | 0.406 |
| 9 | 120.76; 149.47* | 0.394 |
| 10 | 110.87 | 0.431 |
| 11 | 93.96; 110.87 | 0.348 |
| 12 | 104.43 | 1.351 |

The polymers made by the above synthesis scheme have the following specific solvent resistant characteristics.

| x | THF | $CH_2Cl_2$ | $CHCl_3$ | DMAC | NMP | $^{conc}H_2SO_4$ |
|---|---|---|---|---|---|---|
| 2 | I | I | I | SS* | I | S |
| 3 | I | I | I | SS* | I | S |
| 4 | I | I | I | SS* | I | S |
| 5 | I | S* | I | SS* | S* | S |
| 6 | S* | S* | S* | S* | S* | S |
| 7 | S* | S* | S* | S* | S* | S |
| 8 | S* | S* | S* | S* | S* | S |
| 9 | S* | S* | S* | S* | S* | S |
| 10 | S* | S* | S* | S* | S* | S |
| 11 | S* | S* | S* | S* | S* | S |
| 12 | S* | S* | S* | S* | S* | S |

S: soluble at room temp.
S*: soluble upon heating
SS*: slightly soluble upon heating
I: insoluble Another specific example of a polymer of the instant invention is a polymer corresponding to the formula:

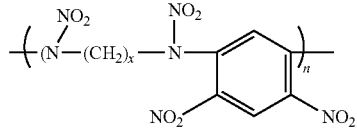

wherein x is in the range of from 2 to 12 and wherein n is greater than about twenty, also useful, for example, in forming solvent resistant coatings and solvent resistant fibers as well as for bonding materials wherein x is in the range of from 2 to 12 and wherein n is greater than twenty. The compounds of this embodiment of the instant invention can be made by nitrating the dinitro analog of the polymer to the tetra-nitro polymer as will be described below in greater detail.

Example 1

A steel object was coated with powdered polymer of the instant invention wherein x in the formula, just infra, is 7.

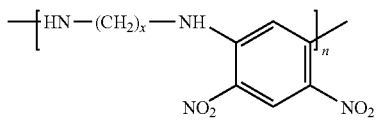

The steel object was heated to melt the polymer so that it evenly coated the steel object. The steel object was cooled to produce a steel object coated with a durable coating.

Example 2

A copper plate was coated with a powdered polymer of the instant invention, wherein x in the formula, just infra was 8.

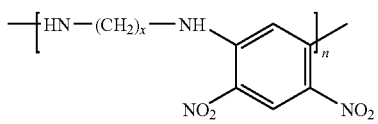

The copper object was heated to melt the polymer so that it evenly coated the copper object. The copper object was cooled to produce a copper object coated with a solvent resistant durable coating.

Example 3

A powdered sample of the instant invention, wherein X in the formula

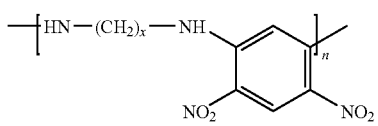

was 9 was placed between two glass plates. Sturdy steel clips held the glass plates together. The prepared sample was heated to melt the polymer and then cooled. The two glass plates were strongly bonded together by the polymer of the instant invention. The bond remains strong even when the assembly was exposed to water and even after extensive exposure to water.

Example 4

A saturated solution of a polymer of the instant invention in aqueous concentrated sulfuric acid, wherein x in the formula

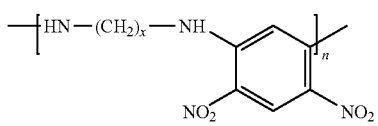

was 10, was spun into water to form solvent resistant fibers of the polymer of the instant invention.

Example 5

The solvent resistant fibers of Example 4 were used to make a filter element for filtering suspended solids from tetrahydrofuran.

Example 6

A saturated solution of a polymer of the instant invention in aqueous concentrated sulfuric acid, wherein x in the formula

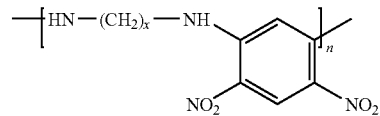

was 10, was spun into water to form solvent resistant fibers of the polymer of the instant invention.

Example 7

The solvent resistant fibers of Example 9 are used to make a filter element for filtering suspended solids from tetrahydrofuran.

Example 8

A 100 mL, three-necked flask was fitted with a nitrogen inlet, a magnetic stir bar and a Dean-Stark trap fitted with a condenser. The flask was charged with aniline (0.93 g, 0.005 mole), 1,5-difluoro-2,4-dinitrobenzene (1.02 g, 0.005 mole), 20 mL of N,N-dimethylacetamide, 15 mL of toluene, and anhydrous potassium carbonate (1.5 g, excess). The reaction vessel was heated with an external temperature-controlled oil bath. The reaction temperature was gradually raised to 135° C., and water, the by-product of the reaction, was removed by azeotropic distillation with toluene. After the removal of water, toluene was gradually removed and the temperature of the reaction mixture was raised to 150° C. The reaction was allowed to continue with stirring at this temperature for 18 h. The heating bath was removed and the temperature of the reaction mixture was allowed to cool to room temperature and then poured into rapidly stirring, acidified (glacial acetic acid) water (150 mL). Saturated aqueous sodium chloride solution (20 mL) was then added and the solid, which slowly precipitates out, was collected by filtration. The crude residue was allowed to dry over-night, dissolved in dichloromethane, washed repeatedly with water, and the organic layer was dried over anhydrous magnesium sulfate and filtered. The filtrate was evaporated at reduced pressure to yield deep brown residue. The residue was dissolved in dichloromethane and eluted on an alumina column using a mobile phase of dichloromethane to yield the following model compound 1.

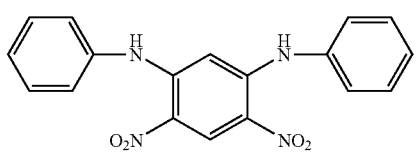

Example 9

The following model compound 2

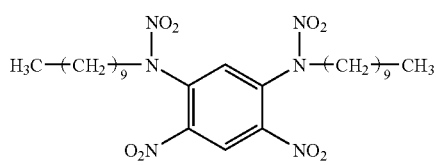

2 was prepared by controlled nitration of the corresponding secondary amine. The starting material, the secondary amine (100 mg) was placed in a one necked-100 mL, round-bottomed flask, fitted with a magnetic stir bar. The flask was cooled to −30° C., by using a dry-ice-acetone bath. A 25 mL, measuring cylinder was cooled by an external ice-water bath, and aqueous concentrated sulfuric acid (9 mL), and aqueous concentrated nitric acid (9 mL) are added to the cylinder and mixed using a disposable pipette. The mixture was allowed to stand in the ice bath for 30 minutes, to equilibrate to the cylinder temperature. The acid solution was added very slowly to the solid starting material in the round-bottomed flask, over a period of 30 minutes. The temperature of the reaction vessel was maintained between −30° C. and −20° C., during the addition process. The reaction was allowed to continue with stirring for an additional 2 hr. The color of the reaction mixture turned aqua blue. At the completion of the reaction, the entire reaction mixture was poured over crushed ice. The ice-water mixture was stirred and allowed to warm up to room temperature. The solid, that precipitated out was filtered, and washed repeatedly with water to remove residual acid. The solid was allowed to dry over-night at room temperature and then was dissolved in dichloromethane washed with water twice, and then with a saturated solution of sodium bicarbonate, and finally with water, a saturated solution of sodium chloride, and then with water again. The organic layer was removed, dried over anhydrous magnesium sulfate, filtered, and the filtrate was evaporated at reduced pressure to yield a pale yellow, very pure crystalline solid. Further purifications were not necessary.

Example 10

The following polymer 3 was prepared in this example:

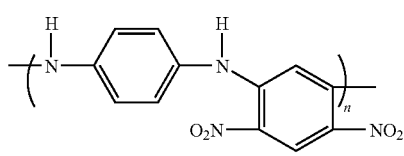

3

The reaction vessel consists of a 100 mL, four-necked, round bottomed flask, fitted with a nitrogen inlet, a thermometer, a Dean-Stark apparatus, fitted with a condenser, and an over-head stirrer. The diamine, trans-1,4-cyclohexanediamine (1.142 g, 0.01 mole), 1,5-difluoro-2,4-dinitrobenzene (2.041 g, 0.01 mole), anhydrous potassium carbonate (2.201 g, excess), diphenyl sulfone, the solvent, (20.0 g), and toluene (20 mL) are added to the reaction vessel. The reaction vessel was heated by an external oil bath. The temperature of the reaction mixture was gradually raised to 130° C., and water, the by-product of the reaction mixture was removed by azeotropic distillation. After the removal of water, the temperature of the reaction mixture was gradually raised to 220° C., over a period of 2 h. The reaction was allowed to continue at this temperature for 10 minutes, and the hot reaction mixture was poured into rapidly stirring acetone (acidified with glacial acetic acid). The solid, which precipitates out, was collected by filtration and then extracted with acetone, water, and acetone, in that order by using a Sohxlet apparatus. The yellow colored powdery polymer was dried in a vacuum oven at 50° C., overnight.

Example 11

The following polymer 4 was prepared in this example:

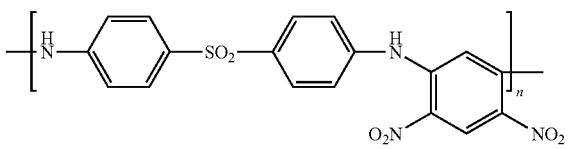

4

The reaction vessel consists of a 100 mL, four-necked, round bottomed flask, fitted with a nitrogen inlet, a thermometer, a Dean-Stark apparatus, fitted with a condenser, and an over-head stirrer. The diamine, 4,4'-diaminodiphenylsulfone (1.24 g, 0.005 mole), 1,5-difluoro-2,4-dinitrobenzene (1.02 g, 0.005 mole), anhydrous potassium carbonate (1.50 g, excess), N,N-dimethylacetamide, the solvent, (20 mL), and toluene (16 mL) are added to the reaction vessel. The reaction vessel was heated by an external oil bath. The temperature of the reaction mixture was gradually raised to 135° C., and water, the by-product of the reaction mixture was removed by azeotropic distillation. After the removal of water, the temperature of the reaction mixture was gradually raised to 150° C., over a period of 2 h. The reaction was allowed to continue at this temperature for 4 hours, and the hot reaction mixture was poured into rapidly stirring acetone (acidified with glacial acetic acid). The solid, which precipitates out, was collected by filtration and was extremely powdery in nature, which was believed to be indicative of a relatively low molecular weight.

Example 12

The following model compound 5 was prepared in this example:

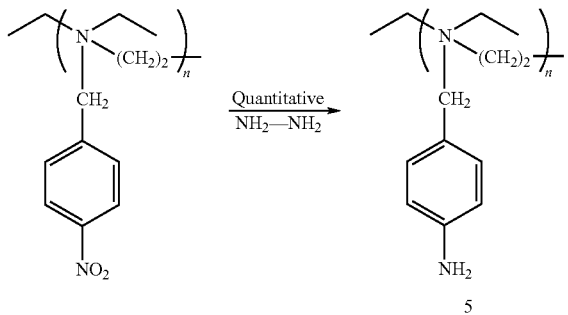

5

The starting material, containing the aromatic nitro group (0.254 g, 0.001 mole) was dissolved in ethanol (2.5 mL) in a 16 oz screw-cap vial. Hydrazine (0.1 mL, 0.003 mole) was added to the yellow colored solution, followed by the addition of 10 drops of 50% aqueous Raney nickel suspension. Vigorous, exothermic reaction ensues with copious evolution of gases. The reaction was allowed to continue with stirring until the temperature of the reaction mixture equilibrates to room temperature, over a period of 20 minutes, and the gas evolution ceases. The reaction mixture was then diluted with 10 mL of dichloromethane, filtered through celite to remove residual solid particles, and the filtrate was evaporated using a rotary evaporator. The desired product was a colorless oil.

Example 13

The reaction vessel consisted of 100 mL round-bottomed flask, fitted with a magnetic stir bar, and a condenser. Model compound 6 (0.478 g, 0.001 mole), and 10 mL of ethanol were added to the reaction vessel. The reaction mixture was allowed to stir at room temperature to obtain a bright yellow homogenous solution. Hydrazine (0.2 mL, 0.006 mole) was added to this yellow colored solution, and the reaction vessel was cooled using an external salted ice-bath. The temperature of the reaction mixture was allowed to reach −5° C., and 20 drops of 50% aqueous Raney nickel suspension was added slowly to the solution. The ice bath was removed and the reaction was allowed to proceed with stirring. Vigorous exothermic reaction ensued, and the reaction was allowed to continue until the temperature of the reaction mixture equilibrated to room temperature, over a period of 30 minutes. It was then poured into ice-water mixture, extracted with dichloromethane, and the organic layer was washed repeatedly with water, dichloromethane was removed using a rotary evaporator to collect compound 7 in quantitative yield.

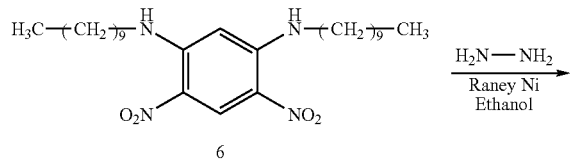

-continued

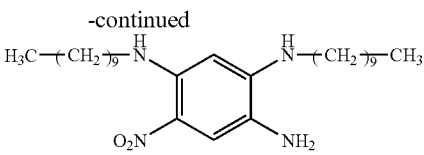

What is claimed is:

1. A tunable explosive composition, said explosive composition comprising a polymer having the general formula:

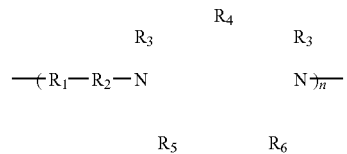

wherein $R_1$ is selected from the group consisting of cyclic and acyclic organic groups, wherein $R_2$ is independently a cyclic or acyclic organic group, wherein $R_3$ is $NO_2$, wherein $R_4$ is selected from the group consisting of a H, $NO_2$ and $NH_2$, wherein $R_5$ is selected from the group consisting of $NO_2$ and $NH_2$, wherein $R_6$ is $NO_2$ or $NH_2$ and where n is greater than about twenty; wherein there is at least five nitro groups present, at least three on a ring and at least two on nitrogen atoms.

* * * * *

UNITED STATES PATENT AND TRADEMARK OFFICE
CERTIFICATE OF CORRECTION

| | | |
|---|---|---|
| PATENT NO. | : 7,776,997 B2 | Page 1 of 1 |
| APPLICATION NO. | : 11/346952 | |
| DATED | : August 17, 2010 | |
| INVENTOR(S) | : Mohanty et al. | |

It is certified that error appears in the above-identified patent and that said Letters Patent is hereby corrected as shown below:

Column 12, replace lines 17 through 22 with the following diagram:

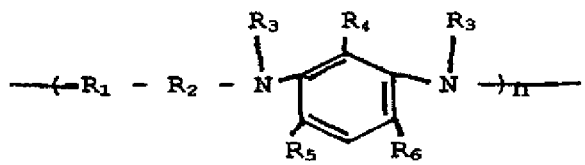

Signed and Sealed this
Twenty-ninth Day of March, 2011

David J. Kappos
*Director of the United States Patent and Trademark Office*